Patented Feb. 28, 1933

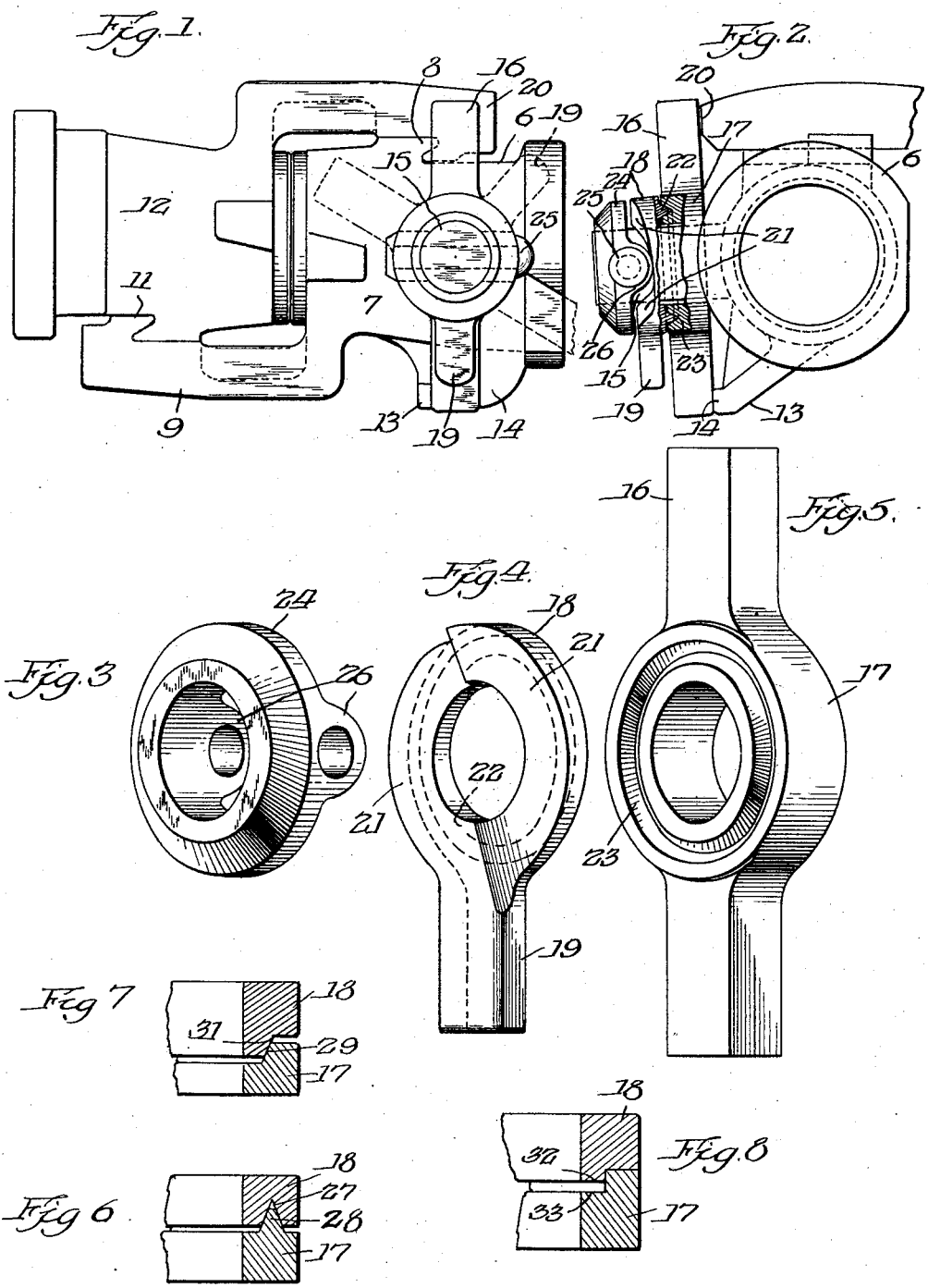

1,899,842

UNITED STATES PATENT OFFICE

FRANCIS N. BARD, OF HIGHLAND PARK, ILLINOIS, ASSIGNOR TO BARCO MANUFACTURING CO., OF CHICAGO, ILLINOIS, A CORPORATION OF ILLINOIS

HOSE COUPLER

Application filed August 21, 1931. Serial No. 558,434.

This invention relates to hose couplings for connecting together the hose or equivalent flexible conduits included in a railway train pipe line containing steam or air under pressure and pertains more particularly to a novel means for locking the couplers or interlocking companion members of the coupling together against accidental disconnection.
One of the purposes of this invention is to provide a coupler lock which will be positive, effective and durable in use and which will not be dependent upon springs or other easily broken parts for its locking effect.
Another object is the provision of a coupler lock which will readily accommodate itself to irregularities and inaccuracies in the structure, size and shape of the interlocking coupler members so that they can be readily and positively locked together irrespective of the variations which are inevitably found to exist in individual coupler heads of this general type.

Another feature of the invention resides in the fact that this coupler lock can be readily and easily manipulated and operated, the looseness and flexibility in the assembly being sufficient to preclude binding of the parts and the imposition of excessive strains on any portion of the lock, the principle of the invention being such that strains are evenly distributed to the locking bar and the parts associated therewith.

Other objects and advantages of this invention will be apparent from the following description when considered in connection with the accompanying drawing, illustrating one preferred embodiment thereof.

Referring to the drawing:
Fig. 1 is a plan view of a coupler equipped with my invention and shown in interconnected relation with a companion coupler;

Fig. 2 is an end view partially in section of the structure shown in Fig. 1;
Figs. 3, 4 and 5 are detailed views respectively of the abutment head, the cam member and the locking bar; and Figs. 6, 7 and 8 are fragmentary sectional views of modified forms of the cam member and locking bar.

Referring now to the drawing more in detail, reference character 6 indicates generally a coupler comprising the coupler head 7 provided at one side with the usual cam lug 8 and at its opposite side with a longitudinally projecting arm 9 equipped with the usual under-cut lug or cam 11. In Fig. 1 the coupler 6 is shown in interconnected relation with a companion coupler 12 similarly shaped for connection to the coupler 6 by interengagement of cooperating parts in the usual manner. The locking link and the particular type of gasket employed is not shown on the drawing as it comprises no part of my present invention.

The coupler head 6 is provided at one side with a laterally projecting bracket or extension 13 providing near its outer end an upwardly facing bearing surface 14 for cooperation with the locking bar as will hereinafter be more apparent. The upper face of the coupler head is provided with a stud 15 extending upwardly from the head and preferably inclined slightly from the vertical toward the bracket side of the coupler head. Upon the stud there is loosely mounted, so as to be capable of rotary and tilting movements, a locking bar 16, the central cored portion of which is enlarged to provide an annular ring or collar 17 loosely surrounding the stud.

Above the collar 17 there is disposed on the stud a cam member comprising an annular portion or collar 18 loosely surrounding the stud and a handle portion 19 projecting radially therefrom. The upper face of the cam member is shaped to provide a pair of oppositely arranged, gradually inclined cam surfaces 21 and the lower face may be provided with an annular tapered rib 22 projecting into a tapered groove 23 formed in the upper face of the locking bar collar 17. The locking bar and the cam member are thus retained against radial displacement relatively to each other and the wedging action of the rib against the side walls of the groove when the parts are forced together holds the bar and cam member against relative movement and frictionally locks the bar in its operative position.

An abutment head 24 surrounding the stud 15 is secured to the stud at or near its upper end by a pin or bolt 25 extending transversely through the head and stud. The lower face of the head is shaped to provide a pair of oppositely disposed downwardly extending abutment members 26 of curved contour so as to provide substantially a line contact between these surfaces and the opposed cam surfaces of the underlying cam member. It will be observed that the contact line of the abutment surfaces 26 is disposed substantially in the plane of the longitudinal axis of the coupler head thereby permitting tilting movements of the cam member and the locking bar about this line of contact as a fulcrum. The locking bar when disposed transversely of the head, as illustrated in full lines in Fig. 1, is therefore permitted to tilt transversely of the head and thereby accommodate itself to variations in elevation of the surfaces with which it engages and particularly those variations which are likely to occur in the arms of the various coupler heads to which the lock carrying coupler is connected in service.

While I have shown for illustrative purposes merely, only one of the coupler heads as equipped with my novel lock, it should be understood that the companion head will customarily in practice be equipped with a similar lock. A lock on one of the heads only, however, will suffice to hold the couplers against accidental displacement from coupled position.

When a coupler embodying my invention is in service, the locking bar and the cam member are swung into the inoperative positions shown in dotted lines in Fig. 1 before connection to a companion coupler is made. After the couplers have been interlockingly connected together in the customary manner, the locking bar 16 is swung into its operative position transversely of the head so that one end overlies the bearing surface 14 of the bracket 13 and the other end overlies the upper face of the arm 20 projecting from the companion head 12. The vertical position of the upper face of the arm 20 will vary with different coupler heads due either to differences in dimensions or to variations from specified dimensions or to the extent to which the arm is forced downwardly behind the lug 8 in establishing the connection. The loose mounting of the locking bar on the stud 15, however, permits the bar to tilt on the stud and thereby accommodate itself to these variations with the result that in every instance, the bar when forced downwardly by the cam member rests firmly at one end against the surface 14 and at its other end against the upper surface of the arm 20.

When the locking bar has been swung to operative position, the cam member is swung in a clockwise direction into the full line position shown in Fig. 1, thereby forcing the locking bar against the bracket 13 and the arm 20 by reason of the wedging action of the cams 21 against the abutment surfaces 26. Should there be any tendency of the locking bar to tilt under the action of the cam member, as for instance if the arm 20 should move slightly vertically, this tilting movement is permitted and accommodated by reason of the line contact between the abutment surfaces 26 and the cam surfaces 21 since the cam member is free to tilt on the stud 15 with the locking bar about the line contact with the abutment surfaces as a fulcrum. Since the height of the upper surface of the arm 20 is more likely to be above than below the height of the bearing surface 14, the stud 15 is preferably inclined slightly toward the bracket side of the head as shown in Fig. 2 to position this stud at right angles to the usual position of the locking bar, thereby reducing the probability of lateral strains upon the stud to a minimum.

The cooperating inclined surfaces of the rib 22 and the groove 23 afford a frictional lock between the bar and the cam member when the parts are forced together under the thrust induced by rotation of the cam member thereby precluding likelihood of reverse rotative movement of the cam member which would free the locking bar for rotation. The parts are consequently frictionally held in operative position to lock the coupler heads together against accidental displacement although capable of being manually released when desired by tapping the handle of the cam member with a hammer to rotate it to unlocking postion, or by otherwise rotating the cam member in the reverse direction.

Instead of providing the groove in the collar 17 of the locking bar and the rib on the lower face of the cam member 18, these parts may be reversed as illustrated in Fig. 6 wherein the cam member is provided with a groove 27 and the locking bar collar is provided with a cooperative wedge rib 28.

Another structure for providing the desired friction between the cam member and the locking bar is illustrated in Fig. 7 from which it will be observed that the collar 17 is provided with an annular inclined surface 29 cooperating with a similarly inclined surface 31 formed on the bottom of the cam member.

If preferred the inclined friction surfaces may be omitted and the friction between the upper face of the collar 17 and the lower face of the cam member 18 may be relied upon to afford the necessary frictional resistance against accidental relative movement of these parts as shown in Fig. 8. The opposed surfaces may be roughened to increase the friction if necessary. In this instance the cam member and collar are maintained in concentric relation by the cooperating flange 32 and groove 33 formed in the respective members.

It will be apparent from the foregoing that I have provided a coupler lock which is devoid of springs or other small parts which are customarily subject to breakage, that my improved lock is simple in construction, economical to manufacture, easy to operate, positive in its locking effect and very durable in service. The specific details shown and described for illustrative purposes merely are obviously capable of considerable modification and variation without departure from the essence of this invention as defined in the following claims.

1. A hose coupler comprising a head having means for interlockingly engaging with corresponding means on a companion head for connecting said heads together, and means for preventing disconnection of the heads, including a bar loosely mounted on a fixed pivot so as to permit rotary and tilting movements of the bar relatively to the pivot, a pair of fixed abutments providing a line contact in a plane perpendicular to the longitudinal axis of said bar when disposed in operative position, and an annular cam member disposed between said abutment members and said bar and loosely pivoted coaxially with the bar so as to also be capable of rotary and tilting movements, said cam member being rotatable independently of the bar to urge both ends of the bar toward the head with equal force irrespective of the tilt of said bar induced by obstruction to its movement.

2. A coupler comprising a head provided with a bearing surface, a projecting arm and with means adapted to be engaged with the arm and head respectively of a companion coupler to connect the couplers together, a stud projecting from said head, a bar loosely mounted on said stud so as to be capable of rotary and tilting movements, said bar being rotatable into operative position overlying said bearing surface and the arm of the companion coupler to prevent disconnection of the couplers, a head fixed on the outer end of said stud and provided with a pair of abutment surfaces projecting toward the bar in a plane perpendicular to the longitudinal axis of the bar when the bar is in operative position, and an annular cam member loosely mounted on the stud between said head and said bar and rotatable relatively thereto to force the bar against said bearing surface and said arm of the companion coupler, the position of said abutment surfaces and the loose mounting of said bar and cam member permitting tilting of the bar and member to compensate for obstructions to the movement of the bar induced by structural irregularities.

3. A hose coupler comprising a head provided with an arm, a bearing surface and means for establishing connection with a companion head, a stud projecting from said head, an abutment head fixed on said stud and provided with a pair of oppositely arranged abutment surfaces extending inwardly toward the coupler head and disposed in a plane extending longitudinally of said coupler head, a bar loosely mounted on said stud so as to be rotatable into a transverse position overlying said bearing surface and the arm of the companion coupler, said loose mounting permitting tilting of the bar induced by its engagement with said arm, a rotatable cam member loosely mounted on said stud between said arm and said abutment head so as to be also capable of rotary and tilting movements on the stud, and means projecting from said cam member whereby the member may be rotated to force and hold said bar against said bearing surface and said arm.

4. A coupler comprising a head adapted to be interlockingly connected with a companion head and means for preventing disconnection of said heads, said means including a rotatable bar, a fixed abutment and a rotatable cam member cooperating with said abutment to hold said bar in operative position, said bar and cam member being provided with cooperatively disposed inclined surfaces affording a frictional lock to prevent relative movement between said bar and cam member.

5. A coupler comprising a head adapted to be interlockingly connected with a companion head, a locking bar rotatably mounted thereon, a fixed abutment head and a cam member rotatable between said abutment head and said locking bar, said bar and member having cooperating means for preventing relative rotative movement between the bar and cam member.

6. A coupler comprising a head having provisions for interlocking connection with a companion head, a stud projecting outwardly from said head and provided at diametrically opposite sides near the outer end thereof with inwardly facing abutment surfaces providing a fulcrum, a locking bar loosely pivoted on said stud and a cam member loosely surrounding said stud between said bar and said fulcrum and adapted upon rotation to exert an inward thrust upon said bar, said member being free to tilt about said abutment surfaces as a fulcrum to conform to the position of said bar.

7. A coupler head constructed for interlocking connection with a companion head, provided with an outstanding stud equipped near its outer end with abutment surfaces facing the head and providing a transverse fulcrum, a locking bar rotatably and tiltably mounted on said stud and means rotatably mounted on said stud between said bar and said fulcrum for forcing said bar toward said head upon rotation of said means, said means being freely tiltable about said fulcrum to conform to the position of said bar.

8. A coupler head constructed for interlocking connection with a companion head, provided with an outstanding stud having laterally projecting abutment surfaces providing a transverse fulcrum disposed diametrically of said stud, a rigid locking bar rotatably mounted on said stud and a member surrounding said stud between said fulcrum and said bar, said member having cam surfaces adapted to engage said fulcrum surfaces whereby said bar is forced toward said head upon rotation of said member, said bar and said member being loosely disposed on said stud so as to tilt as a unit about said fulcrum to permit said bar to conform to variations in the surfaces against which the same is thrust.

9. A coupler head constructed for interlocking connection with a companion head, provided with an outstanding stud having abutment surfaces forming a transversely disposed fulcrum, a locking bar mounted for rocking and rotative movements on said stud, and a member loosely surrounding said stud between said fulcrum and said bar and capable of rocking and rotative movements relatively to the stud, said member having cam surfaces on one face engageable with said fulcrum and having friction surfaces on its opposite face engageable with cooperative friction surfaces on said bar whereby said bar and member are frictionally held against accidental relative rotative movement.

In witness of the foregoing I affix my signature.

FRANCIS N. BARD.